UNITED STATES PATENT OFFICE.

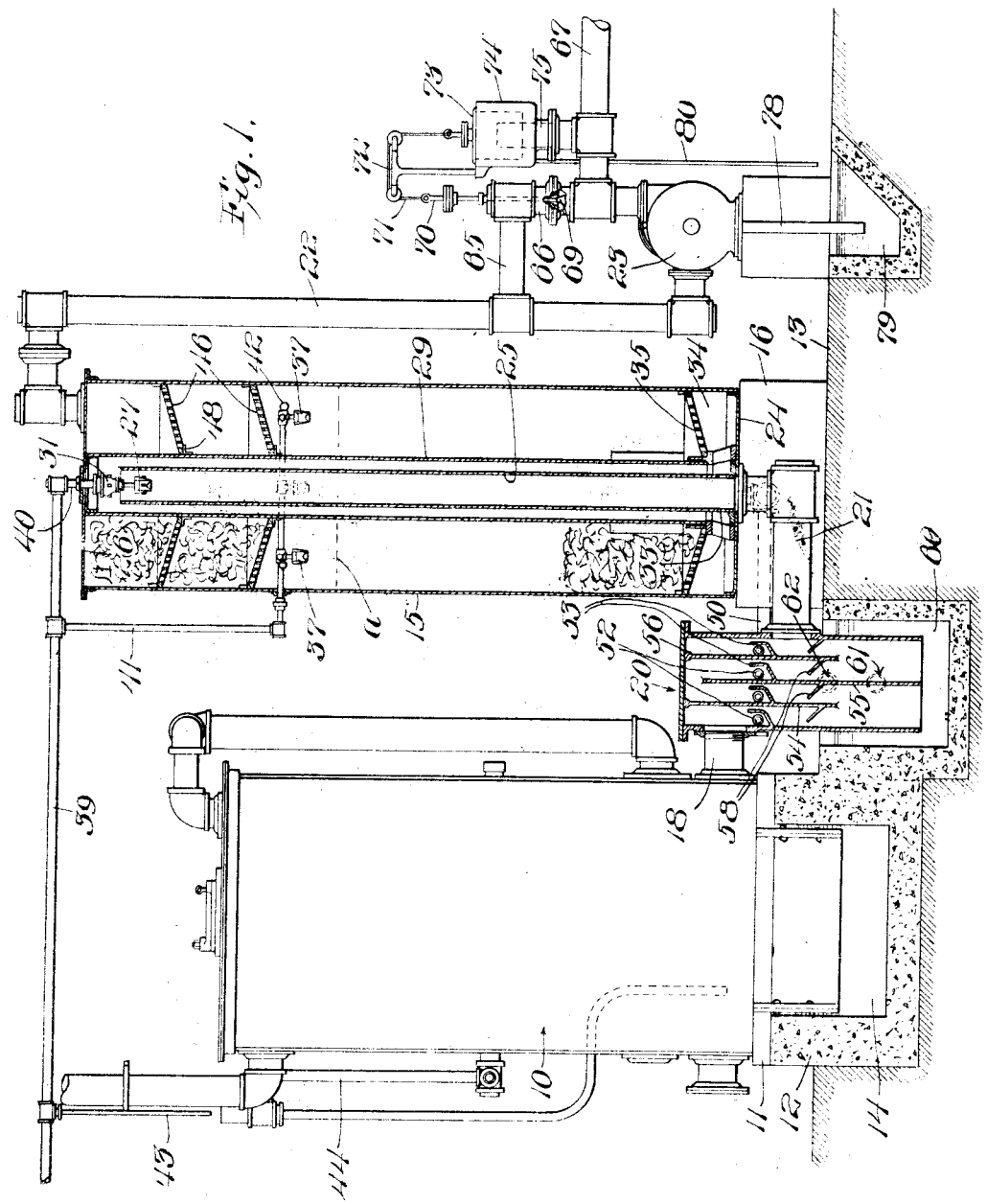

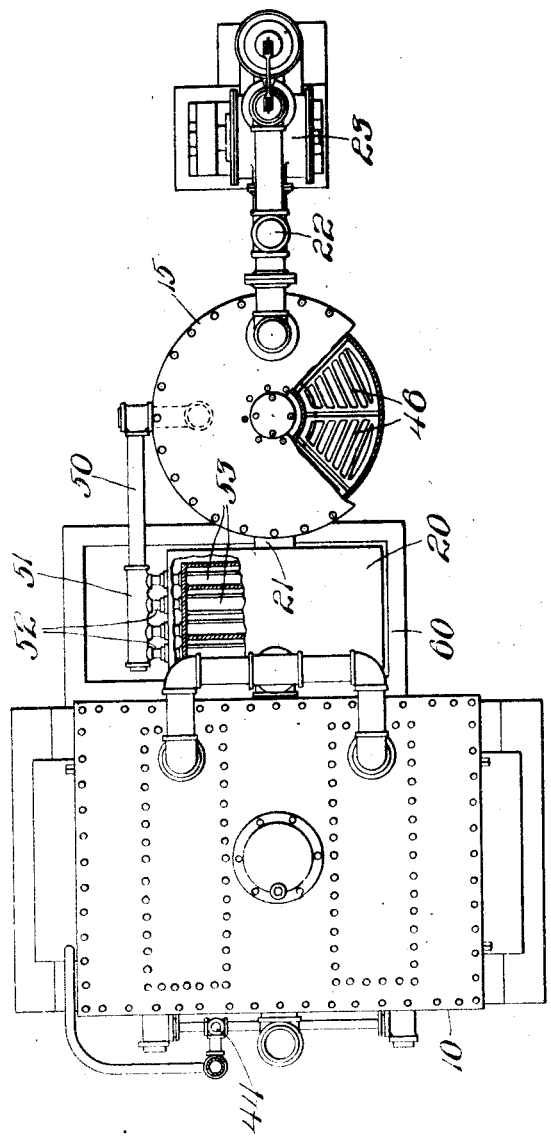

CARL O. NORDENSSON, OF ELKHORN, WISCONSIN, ASSIGNOR TO GRACE A. SOUTHWELL, TRUSTEE, OF CHICAGO, ILLINOIS.

GAS-PRODUCER PLANT.

1,066,837.   Specification of Letters Patent.   Patented July 8, 1913.

Application filed May 2, 1912. Serial No. 694,618.

*To all whom it may concern:*

Be it known that I, CARL O. NORDENSSON, a subject of the King of Sweden, and a resident of Elkhorn, in the county of Walworth and State of Wisconsin, have invented certain new and useful Improvements in Gas-Producer Plants; and I do hereby declare that the following is a full, clear, and exact description thereof, reference being had to the accompanying drawings, and to the characters of reference marked thereon, which form a part of this specification.

This invention relates to an improved gas producer plant or system, and the invention consists in the construction, combination and arrangement of the parts hereinafter described and more particularly pointed out in the appended claims.

Among the objects of the invention is to simplify and improve the construction of gas producing plants or systems, of that kind more especially adapted to furnish clean and cool gas to a power plant for operating internal combustion engines and for other purposes requiring clean gas.

A further object of the invention is to provide a gas producer system in which the cleaning and cooling apparatus provides a large contact surface between the gas and water while operating under a low pressure, thereby effecting a saving of power to withdraw the gas from the system.

A further object of the invention is to provide a system having a cleaning and cooling apparatus which operates to bring the cleanest gas into contact with the cleanest water, and vice versa, thereby to a maximum extent utilizing the cleaning and cooling properties of the water, and effecting a material saving in the volume of water used and in the power required to handle the water.

Other objects of the invention will appear from the following description and the invention consists in the combination and arrangement of the parts hereinafter set forth and more particularly pointed out in the appended claims.

In the drawings, Figure 1 is a view, partly in elevation and partly in vertical section of a gas producer plant embodying my invention. Fig. 2 is a plan view thereof, with parts broken away to reveal the interior construction.

As shown in the drawings, 10 designates the producer shell which incloses the gas generating chamber. It is supported by the girders 11 on the walls 12 of a water-seal ash tray. The entire plant is preferably supported on a concrete foundation 13.

15 designates the shell of a combined scrubber and purifier through which the gas is passed on its way from the producer to the point of consumption or use. It is supported in any suitable manner on a foundation 16, which latter rests on the concrete foundation 13. The gas from the producer does not pass directly to the scrubber and purifier, but is directed through the gas outlet pipe 18 into a preliminary washing and cooling chamber, designated as a whole by 20. From the latter device the gas passes through a pipe 21 to the combined scrubber and purifier. From the upper end of the combined scrubber and purifier the gas passes, through a pipe 22, to a positive exhauster 23, which maintains circulation of air and vapor through the producer and withdraws the gas from the producer through the cleaning and cooling apparatus. The exhauster may discharge the cleaned and cooled gas into a holder, when the gas is to be stored for use, or an internal combustion engine may be connected directly to the outlet pipe of the exhauster when the producer plant is intended to furnish gas to such engine.

The gas from the producer is discharged from the pipe 21 through the bottom 24 of the shell 15 and directly into the lower end of the upstanding pipe 25 which is arranged centrally within the shell 15, and is open at its upper end near the top plate 26 of the shell.

27 designates a sprinkler head that extends a short distance into the upper, open end of the pipe 25 and is provided with spray openings to deliver a film of water on the inner surface of said pipe, upwardly in contact with which the gas passes. Said central pipe 25 is contained within a second pipe 29 that is closed at its upper end, above the central pipe 25, and extends from the top plate 26 of said shell downwardly to near the bottom 24 thereof. The gas which passes upwardly through the central pipe 25 turns outwardly and downwardly at the upper end of said inner pipe and flows downwardly through the outer pipe 29. Arranged at the upper end of said pipe 29, and above the pipe 25, is a sprinkler head 31 which is provided with nozzle openings adapted to direct the water against the inner side of the pipe 29, and across the path of the gas as it passes from the inner pipe 25 to the outer pipe 29. Thus the gas which flows from the pipe 25 to the pipe 29 passes through the jet of water discharged from the sprinkler head 31, and also passes down the pipe 29 in contact with the film of water which trickles down the inner side of said latter pipe. The gas passes from the lower end of the pipe 29 outwardly through openings 33 at the bottom of the latter pipe into a lower chamber 34 at the bottom of the shell 15, and thence upwardly through said shell to the outlet pipe 22. The said shell 15 is provided just above said chamber 34 with a reticulated grate 35 which supports a body of filtering material, such as coke or the like, which may extend to the level indicated by the dotted line a shown in Fig. 1.

37, 37 designate a plurality of spray heads arranged in a circular series above said filter or coke bed, through which water is discharged upon the coke bed and trickles down through the interstices thereof and in a thin film over the exterior of the particles of coke, in contact with which the gas passes as it rises through said bed.

Water is supplied to the spray heads 27, 31 and 37 through a pipe 39, provided with a branch 40, that is connected directly to the heads 27 and 31, and with a branch 41 that is connected to an annular feed pipe or header 42 from which the spray heads 37 depend. The said water pipe 39 is also provided with a branch 43 which supplies water to the pipe 44 which communicate with the vaporizer tanks within the producer shell.

Arranged above the spray heads 37 in the tank or shell 15 are one or more grates 46 upon which is adapted to be supported a dry filtering or purifying material, such as excelsior, sawdust and the like, through which the washed or scrubbed gas passes to remove from the same the impurities contained therein and to dry the gas. The said grates 35 and 46 are preferably made in the form shown in Fig. 2, in which each grate comprises a plurality of segments, all made from the same pattern, and supported at their inner ends on ledges 48 attached to and surrounding the outer pipe 29 and supported on their outer edges against the shell 15.

The water which drips through the central pipe 25 finds its way to the casing 20 where it accumulates in a sealing well below, as hereinafter described. The water which drips through the pipe 29 and the shell 15 is collected at the bottom of said shell and is discharged therefrom through a pipe 50. Said pipe communicates with a header 51 located horizontally at the side of the preliminary washing and cooling chamber 20, and said header is provided with branches 52, 52 which extend inwardly through one side wall of the chamber 20 and discharge their contents into troughs 53, 53 that are formed on or supported by, and extend laterally from, one side wall of said chamber and from spaced, vertical plates or partitions 54, 55 therein. The outlet ends of said pipes are below the water level in the troughs, whereby the pipes are sealed. The water discharged into the troughs flows downwardly along the vertical surfaces of the plates and chamber walls. The plates 54 extend to the top wall 56 of the chamber, while the plate 55 terminates short of said top wall, so as to thereby provide a zig-zag path for the flow of gas through the casing from the pipe 18 to the pipe 21, and therefore in series past said pipes 52 and shelves or troughs 53. Preferably said plates 54, 55 are provided below the shelves 53 with other oppositely arranged shelves or troughs 58 which intercept the water flowing down the sides of the plates and walls and divert the water so intercepted across the spaces between the same to thereby bring the gas flowing through the chamber into more intimate contact with the cleaning and cooling water. The side walls of said chamber and the central plate 55 extend downwardly into a sealing well 60 formed in the concrete foundation 13, and the lower edges of said wall and plate are adapted to be submerged by a body of water in said well, so as to thereby seal the interior of the producer shell and the scrubber against the atmosphere. The said well 60 is provided with vertically separated overflow outlets 61, 62. When the former is closed and the latter is opened the water in the seal well rises above the lower edges of the plates 54 and seals or shuts off the producer shell from the scrubber. When the outlet 62 is closed and the inlet 61 is opened the water in the seal well drops below said plates 54 and permits free zig-zag flow of the gas from the producer to the scrubber, but maintains the seal against the atmosphere.

The arrangement of the chamber 20 between the gas outlet side of the producer and the inlet side of the combined scrubber and purifier described provides means, in addition to the sealing of the system at this point, for preliminarily washing and cooling the gas as it is discharged from the producer, by the use of water which has served the purpose in the scrubber of finally washing and cooling the gas. The water discharged into said preliminary washing and cooling chamber through the pipes 52 contains, of course, a percentage of impurities removed from the gas in the scrubber, but is sufficiently clean to remove a large percentage of the impurities from the gas which issues directly from the gas collecting chamber of the producer, and is also cooler than the gas discharged from the producer so as to thereby absorb a substantial percentage of the sensible heat of the gas. This arrangement is of considerable practical advantage inasmuch as the cleaning and cooling water is utilized to a maximum extent to clean and cool the gas before the water is discharged from the system thereby effecting a material saving in the volume of water handled and in the power required to pump the water.

The construction and arrangement of the scrubber and purifier described is exceedingly simple and compact, whereby the washing and cooling of the gas is carried on in a small space and by the use of an economical construction. The arrangement of the pipes 25 and 29 and the spray nozzles at the upper ends thereof produces an exceedingly simple and compact means for passing the gas through and in contact with the cooling and cleaning water, and a construction which requires a moderate volume of water to cool and clean the gas.

The discharge pipe 22 which leads from the combined scrubber and purifier to the suction pipe 23 is provided near the exhauster with a by-pass pipe or branch 65 that is connected by a pipe 66 with the outlet pipe 67 of the exhauster. The by-pass thus arranged is normally open to permit the moving column of gas to circulate through the by-pass circuit when the engine, with which the pipe 67 is connected, is taking a normal supply of gas. The by-pass is adapted to be closed by a valve 69 arranged in the pipe 66 when a greater than normal demand is made on the engine or other gas consuming device to stimulate the producer to greater activity. For this purpose, said valve is provided with a stem 70 that is connected at its upper end with one end of a cable 71 which is trained about a suitable fixed guide 72, and is connected at its other end with a bell 73 that dips into a body of liquid in an upwardly opening cup 74. Extending upwardly through the bottom of said cup and into the bell above the liquid level therein is a branch 75 of the outlet pipe 76. When, therefore, an abnormal operation of the engine produces a predetermined suction or low pressure in the outlet pipe, the bell is drawn downwardly and moves the valve 69 against its seat to close the by-pass circuit, so as to stimulate the action of the producer to supply the gas demanded by the engine. The said exhauster is provided with a seal pipe 78 that dips into a body of water in a seal well 79 below the exhauster. Water overflows from the cup 74 through an overflow pipe 80.

An advantage of the scrubber is that a large contact surface is provided between the gas and water and in a space where the operating pressure is very low or moderate. Thus power to maintain the producer in operation is economized. The construction of the scrubber and preliminary cooler and cleaner coöperate to produce a clean and cool gas with a maximum of efficiency and with a minimum amount of water and a moderate power expense to operate the system.

I claim as my invention:—

1. A gas producer system comprising a generator, a scrubber having means for supplying water thereto, a preliminary gas cooling and cleaning chamber between the generator and the scrubber at the lower end of the scrubber and having therein partitions to form a zig-zag path for the gas from the generator to the scrubber, and means for directing the used water from the scrubber upon said partitions of the chamber, whereby the gas passes from the producer to the scrubber in contact with the used water.

2. A gas producer system comprising a generator, a scrubber with means for supplying water thereto, a chamber affording communication between the generator and the scrubber and provided with a series of internal plates to afford a zig-zag path for the gas, and means for directing the used water from the scrubber to said plates to cause the water to trickle thereover.

3. A gas producer system comprising a generator, a scrubber, with means for supplying water thereto, a chamber affording communication between the generator and scrubber and provided with a series of internal plates to afford a zig-zag path for the gas, said plates being provided on their sides with troughs and a pipe leading from the scrubber and provided with a plurality of branches which discharge into the troughs in said chamber.

4. A gas producer system comprising a generator, a scrubber, with means for supplying water thereto, a chamber affording communication between the generator and scrubber and provided with a series of laterally spaced, vertical partitions arranged to afford a zig-zag path for the gas which passes through the chamber, said partitions being provided with upper and lower troughs which extend laterally into the spaces between the partitions, and a pipe leading from the scrubber and provided with a plurality of branches leading into the upper series of troughs.

5. A gas producer system comprising a generator, a scrubber, a chamber at the lower end of said scrubber affording communication between the said generator and scrubber and formed with an internal zig-zag passageway for the gas, means for spraying water on the sides of the passageway, a seal well into which said chamber extends and supplied with water which trickles through said passageway, said well being provided with vertically separated outlets adapted to be separately closed to thereby separately afford a water seal between the chamber and the atmosphere and between the generator and scrubber.

6. A gas producer system comprising a generator, a scrubber, a chamber affording communication between said generator and scrubber and provided with a series of vertical, laterally spaced plates arranged to form a zig-zag path for the gas, some of which plates extend below the others, means for spraying water against the sides of the plates, a seal well in which the water from the plates accumulates and into which the lower ends of said plates extend, said seal well being provided with vertically separated overflow outlets, one of which is below and the other of which is above the level of the lower ends of the shorter plates.

7. A gas producer system comprising a generator, and a scrubber which receives gas therefrom, comprising a shell, an upright pipe located centrally therein and open at its upper end and connected at its lower end with the exit pipe of the producer, a pipe surrounding the central pipe which is closed at its upper end and open at its lower end, means for supporting a filter bed in the shell exterior to said pipes and spray nozzles at the upper ends of said pipes and above the filter bed support.

8. A gas producer system comprising a generator and a scrubber which receives the gas therefrom, comprising a shell, an upright pipe located centrally therein and open at its upper end and connected at its lower end with the exit pipe of the producer, a second pipe surrounding the central pipe and closed at its upper end and open at its lower end, means for supporting a filter bed in the shell exterior to said pipes, spray nozzles at the upper ends of said pipe and above the filter bed support and a support within the upper end of the shell exterior said pipes for a layer of purifying material.

9. A gas producer comprising a generator and a scrubber which receives gas therefrom, comprising an upright shell provided at its upper end with a draw-off pipe, an upright pipe located centrally within the shell and connected at its lower end with the gas exit pipe of the producer, a spray nozzle in the upper open end of the said pipe, a second pipe surrounding the central pipe and closed at its upper end and open at its lower end, a spray nozzle in the upper end of the second pipe above the open end of the central pipe, a support in the lower end of the shell exterior to said pipes for a body of filtering material, and spray nozzles within the shell above said support.

In testimony, that I claim the foregoing as my invention I affix my signature in the presence of two witnesses, this 27th day of April, A. D. 1912.

CARL O. NORDENSSON.

Witnesses:
G. E. DOWLE,
W. L. HALL.